Oct. 27, 1964 D. J. MacGREGOR ETAL 3,154,695
GATING CONTROL APPARATUS WHEREIN STATIC SWITCHES IN THE
RESPECTIVE PHASE LINES OF A POLYPHASE SYSTEM ARE
PHASE-SEQUENCE GATED BY A CONTROLLED
GATING SIGNAL
Filed Dec. 14, 1961

WITNESSES
John E. Healey, Jr.
James F. Young

INVENTORS
Dean J. MacGregor, Stanley D. Henderson, Jr. &
Arthur S. Nadrowski
BY
Clement J. Paynokas
ATTORNEY

United States Patent Office 3,154,695
Patented Oct. 27, 1964

3,154,695
GATING CONTROL APPARATUS WHEREIN STATIC SWITCHES IN THE RESPECTIVE PHASE LINES OF A POLYPHASE SYSTEM ARE PHASE-SEQUENCE GATED BY A CONTROLLED GATING SIGNAL
Dean J. MacGregor, Stanley D. Henderson, Jr., and Arthur S. Nadrowski, Buffalo, N.Y., assignors to Westinghouse Electric Corporation, East Pittsburgh, Pa., a corporation of Pennsylvania
Filed Dec. 14, 1961, Ser. No. 159,398
7 Claims. (Cl. 307—88.5)

This invention relates to systems for controlling polyphase supply circuits employing gated static switching devices in the phase lines of the system.

The invention is directed to a static gating circuit which ensures that a gating signal is present at the control electrode of the switching devices when the voltage across the switching device in each phase goes through zero in the conductive polarity (the forward) direction.

In accordance with one embodiment of the invention, a D.C. (direct current) gate current is continuously applied to the gates (control electrodes) of the switching devices by means of circuitry including a transformer with a plurality of isolated secondaries each connected through a rectifier and filter to the gate of a different one of the switching devices, the primary of the transformer being supplied with A.C. (alternating current) through circuitry controlled by a D.C. signal supplied by a digital logic circuit.

It is, therefore, an object of the present invention to provide a static gating circuit which will ensure the presence of gating signals at the control electrodes of gate controlled switching devices in polyphase lines when the voltage across the switching device in each phase line passes through zero in the conductive polarity direction.

Figure 1:
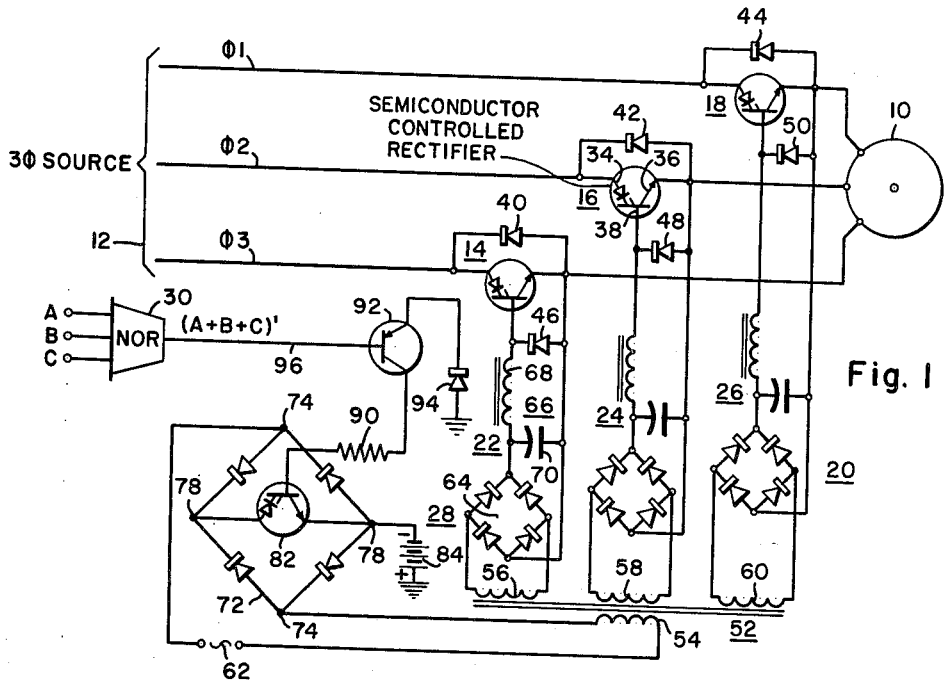
Figure 2:
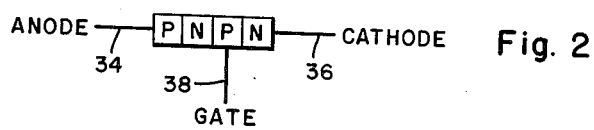

Other and further objects of the invention will become apparent from the following description taken in conjunction with the drawings wherein:

FIGURE 1 is a diagram of a motor control circuit embodying features of the invention; and FIG. 2 is a structural diagram of an example of a semiconductor switching device which may be employed in the invention.

In the system shown in the drawing, a three phase motor 10 is supplied with power from a suitable source of A.C. 12 through phase lines $\phi 1$, $\phi 2$ and $\phi 3$, controlled by gated static switching devices 14, 16 and 18, respectively. The invention is particularly advantageous with switching devices which have the characteristic of being rendered conductive (gated) during particular polarity half-cycles of the impressed A.C. in response to a gating signal on the control electrode of the device coincident with at least a portion of said particular polarity half-cycles. A controlled rectifier is an example of such a switching device.

A continuous D.C. gating signal is applied to the switching devices by a gating circuit 20 provided with a plurality of conductively isolated sub-circuits 22, 24 and 26 associated respectively with switching devices 14, 16 and 18. Since the only traceable paths between the sub-circuits 22, 24 and 26, are through the load 10 and the source 12, the sub-circuits are effectively isolated from each other, thus preserving isolation between the power phases and avoiding serious interphase short circuits. The gate circuit 20 is switched ON and OFF by a static switching system 28 in response to the digital output of a logic element 30.

By way of example, and not in a limiting sense, the switching devices 14, 16 and 18 are shown as controlled semiconductor rectifiers of the PNPN type seen in FIG. 2. Each switching device includes an anode electrode 34, a cathode electrode 36 and a control or gate electrode 38. The power path (anode-cathode circuit) of each is in series with its associated phase line.

Controlled rectifiers of the type shown in FIG. 2 are characterized in that with forward voltage applied to the device the device blocks the flow of current until the forward breakover voltage is reached, at which point the device switches into a high conduction state with high current flow and low voltage drop across the device. Thus, the devices have a hyperconductive negative resistance breakover characteristic. The forward cathode-anode voltage at which the device breaks down may be substantially reduced by applying a gate signal from gate electrode to cathode electrode, i.e. across the gate and cathode electrodes. Thus, the breakover voltage is adjustable. For the PNPN device shown, the gate signal must be positive at the gate electrode. If the gating signal is removed, the device returns to its forward blocking capability when the cathode-anode current is interrupted or diverted by some external means. One form of interruption is current reversal. In these specific examples shown, forward voltage is that applied across the switching device when positive voltage is applied to the anode electrode 34 of the device. Thus, the device when gated conducts on the positive half-cycle of applied A.C. During the reverse half-cycle, current is allowed to pass through each phase line by way of diodes 40, 42 and 44 shunted across the respective switching devices. Protection for the gate junctions of the respective switching devices against excessive inverse voltages is provided by diodes 46, 48 and 50 connected from gate to cathode of the respective devices.

The gating circuit 20 includes a transformer 52 with a primary winding 54 and secondary windings 56, 58 and 60. The primary 54 is supplied with A.C. from a suitable source 62 through the switching circuit 28. Each of the secondaries of this transformer is connected through a rectifier and a filter to the gate electrode of one of the switching devices, forming for that device an individual isolated continuous D.C. gate signal supply. These circuits being the same, only one, the sub-circuit 22 associated with switching device 14, will be described in detail. Included in the sub-circuit 22 is an A.C.-D.C. (alternating current-to-direct circuit) rectifier 64, and an energy storage circuit 66, for example, the filter shown formed by a choke 68 and a condenser 70. The D.C. output of circuit 22 is connected across the gate and cathode terminals of the switching device 14, the positive output of circuit 22 being connected to the gate electrode. The filter 66 prevents the D.C. from ever going below the magnitude required to gate the switching device, so that the device can always fire whenever the switching device is forward biased. It is preferable that rectifier 64 be of the full wave type in order to provide more efficiency and smoother output with smaller filter components.

The switching circuit 28 includes a current directional bridge 72 having A.C. terminals 74 in series with the source 62 and transformer primary 54, and D.C. terminal 78 connected in series with the switch terminals of a static unidirectional switching device 82, for example, a device having a hyperconductive negative resistance controllable breakover characteristic, such as the controlled rectifier illustrated in FIG. 2. The controlled rectifier 82 includes a gate electrode connected to the positive side of a current source 84 through a current limiting resistor 90, the output circuit of a transistor 92, and a diode 94. Resistor 90 limits the gate current to the thermal rating of the switching device 82. By providing a small negative bias, diode 94 tends to hold transistor 92 at cutoff. The switching device 82 is gated whenever transistor 92 is turned on by a properly poled signal applied to the base of the transistor (negative for the PNP shown). Any suitable circuitry may be employed to selectively turn transistor 92 ON and OFF. By switching the D.C. circuit of the bridge 72 ON and OFF with the switching device 82, the bridge 72 acts as an A.C. switch in the line between transformer primary 54 and the A.C. source 62.

The control input to transistor 92 may be supplied by a digital logic circuit, for example the NOR element 30 having inputs A, B and C, and an output connected over a line 96 to the input of transistor 92. It may arbitrarily be assumed that a ONE (binary 1) will turn ON transistor 92, and that a ZERO (binary 0) will turn OFF the transistor. As is well known, the Boolean expression for the logic operation performed by a NOR element is the NOT of the OR of its inputs. For example, with three inputs A, B and C, the output of the NOR element is the Boolean expression (A+B+C)' where "+" signifies OR and the prime notation (') signifies NOT. This expression may be read as the NOT of (A OR B OR C). Thus the NOR element 30 will assume one output mode to supply a ONE out when each of its inputs A, B and C is a ZERO, and another output mode to supply a ZERO out when any one of its inputs is a ONE. NOR elements are so well known that further description is unnecessary. The inputs A, B and C may be supplied by any suitable programming or control circuitry.

From the description herein, it is apparent that the switching circuit 28 is turned ON and OFF by turning transistor 92 ON and OFF respectively.

The switching circuit 28 provides a static D.C. responsive common control for selectively rendering the gating circuits 22, 24 and 26 simultaneously operative or inoperative as desired. When switching circuit 28 is ON, transformer 52 is energized and the gating circuits are simultaneously rendered operative to supply continuous D.C. gating signals to the switching devices 14, 16 and 18. On the other hand, when the switching circuit 28 is turned OFF, the transformer 52 is de-energized and the gating circuits 22, 24 and 26 are rendered inoperative simultaneously.

Because of the low level D.C. input signal required to drive the transistor 92, the system can be conveniently controlled by low output level logic components such as the NOR element 30 shown by way of example.

From the foregoing description, it is apparent that the present disclosure provides a D.C. controlled static gating circuit for gated switches in a polyphase system, which circuit provides the necessary isolation between power phases and also avoids voltage synchronizing problems by applying continuous D.C. gate signals to the switches.

It is to be understood that the herein described arrangements are simply illustrative of the principles of the invention, and that other embodiments and applications are within the spirit and scope of the invention.

We claim as our invention:

1. In a polyphase supply circuit for transmitting alternating current from a source to a load and having static switching means for each phase of said supply circuit, each said switching means having a control electrode and a conductive state in response to a gating signal on said control electrode, individual gate signal supply means for supplying the control electrode of each said switching means with a continuous direct current gating signal, each said gate supply means comprising alternating current to direct current conversion means and reactive storage means for maintaining a predetermined minimum direct current output on the gate of its associated switching device, the direct current side of the conversion means and the storage means being connected to the control electrode of the associated switching device, an alternating current input circuit coupled to and common to all said alternating current to direct current conversion means, and a digital logic circuit, having respective input and output circuits and adapted to assume first and second different output modes in response respectively to different predetermined input conditions of the logic circuit, said alternating current input circuit including static switching means responsive to said output modes of the logic circuit for selectively energizing and deenergizing said alternating current input circuit.

2. In a polyphase supply circuit for transmitting alternating current from a source to a load, which supply circuit has static switching means for each phase of said supply circuit, each said switching means having a control electrode for gating the switching means in response to a gating signal applied to the control electrode, individual gate signal supply means for supplying the control electrode of each said switching means with a direct current gating signal, each said gate signal supply means comprising alternating current to direct current conversion means whose direct current output is connected to the control electrode of its associated switching means, the direct current outputs of said conversion means being conductively isolated from each other, common alternating current input means coupled to all said alternating current to direct current conversion means, and control means coupled to said alternating current input means for selectively energizing and deenergizing said alternating current input means, said control means comprising a static unidirectional switch, and alternating current to direct current conversion means having alternating current input terminals coupled to said alternating current input means and also having direct current output terminals, said static unidirectional switch being connected across the latter terminals.

3. The combination as in claim 2 wherein each said static switching means comprises semiconductor switching means.

4. In a polyphase supply circuit for transmitting alternating current from a source to a load and having static switching means for each phase of said supply circuit, each said switching means having a control electrode and a unidirectional conductive state in response to a gating signal on said control electrode, individual gate signal supply means for supplying the control electrode of each said switching means with a continuous direct current gating signal, each said gate supply means comprising alternating current to direct current conversion means and reactive storage means for maintaining direct current of at least gating magnitude on the gate of its associated switching device, the direct current side of the conversion means and the storage means being connected to the control electrode of the associated device, the direct current outputs of all said conversion means being conductively isolated, a common alternating current input circuit coupled to all said alternating current to direct current conversion means, and control means for selectively energizing and deenergizing said common alternating current input circuit, said control means comprising a supply line for connecting said common alternating current input circuit to an alternating current source, a unidirectional static switch which is adapted to conduct in response to the application of a control signal thereto, and alternating current to direct current conversion means having alternating current input terminals connected in series with said supply line and also having direct current output terminals across which is connected said unidirectional static switch.

5. In a polyphase supply circuit for transmitting alternating current from a source to a load and having static switching means for each phase of said supply circuit, each said switching means having a control electrode and a conductive state in response to a gating signal applied to said control electrode, individual gate supply means for supplying the control electrode of each said switching means with a direct current gating signal, each said gate supply means comprising a rectifier and a transformer secondary circuit coupled through said rectifier to the control electrode of its associated switching means, a common primary circuit coupled to said transformer secondary circuits, and control means for selectively energizing and deenergizing said common primary circuit, said control means comprising an input supply line connected to said primary circuit for receiving alternating current and supplying it to the primary circuit, a controllable unidirectional static switch, and alternating current to direct current conversion means having alternating current input terminals in series with said supply line and also having direct current output terminals across which said unidirectional switch is connected, the latter switch being adapted to conduct in response to the application of a control signal thereto.

6. The combination as in claim 5 wherein each said static switching means comprises semiconductor switching means.

7. In a polyphase power transmission apparatus which includes a plurality of phase lines for coupling an alternating current source to a load and wherein there is a static switch in each of said phase lines, each switch having a control electrode and being adapted to assume a conductive state in response to a gating signal applied to its control electrode, an alternating current energizable gating system for supplying direct current gating signals to said control electrodes, said gating system comprising, individual gate supply means for supplying the control electrode of each said static switch with a direct current continuous gating signal, each said gate supply means comprising an alternating current to direct current rectifier, a transformer secondary circuit coupled through said rectifier to the control electrode of its associated static switch, and reactive energy storage means in circuit with the direct current side of said rectifier for maintaining a predetermined minimum direct current on the control electrode of the associated static switch, a common primary circuit coupled to said transformer secondary circuits, and control means for selectively energizing and deenergizing said primary circuit, said control means comprising a supply line for connecting said primary circuit to an alternating current source, a unidirectional controllable static switch adapted to conduct in response to a control signal applied thereto, and a rectifier having alternating current input terminals and direct current output terminals, said alternating current input terminals being connected into said supply line, said unidirectional switch being connected across said direct current output terminals.

References Cited in the file of this patent
UNITED STATES PATENTS

| | | |
|---|---|---|
| 2,722,649 | Immel et al. | Nov. 1, 1955 |
| 2,853,672 | Parsons | Sept. 23, 1958 |
| 3,040,235 | Schemel et al. | June 19, 1962 |
| 3,050,662 | Miller et al. | Aug. 21, 1962 |